(12) United States Patent
Xie (10) Patent No.: US 8,526,506 B1
(45) Date of Patent: Sep. 3, 2013

(54) SYSTEM AND METHOD FOR TRANSCODING WITH QUALITY ENHANCEMENT

(75) Inventor: Ian Xie, Redwood City, CA (US)

(73) Assignee: Ipera Technology, Inc., San Mateo, CA (US)

( * ) Notice: Subject to any disclaimer, the term of this patent is extended or adjusted under 35 U.S.C. 154(b) by 889 days.

(21) Appl. No.: 12/268,289

(22) Filed: Nov. 10, 2008

Related U.S. Application Data (60) Provisional application No. 61/089,448, filed on Aug. 15, 2008.

(51) Int. Cl.
*H04N 7/12* (2006.01)

(52) U.S. Cl.
USPC .................................................. 375/240.26

(58) Field of Classification Search
None
See application file for complete search history.

(56) References Cited

U.S. PATENT DOCUMENTS

| | | | |
|---|---|---|---|
| 5,689,800 A | 11/1997 | Downs | |
| 5,850,294 A * | 12/1998 | Apostolopoulos et al. | 358/426.14 |
| 6,188,799 B1 * | 2/2001 | Tan et al. | 382/260 |
| 6,434,197 B1 * | 8/2002 | Wang et al. | 375/240.29 |
| 6,724,825 B1 | 4/2004 | Nemiroff et al. | |
| 6,748,113 B1 * | 6/2004 | Kondo et al. | 382/232 |
| 2001/0008544 A1 | 7/2001 | Ishiyama | |
| 2001/0025326 A1 | 9/2001 | Kizaki | |
| 2002/0070957 A1 | 6/2002 | Trajkovic et al. | |
| 2002/0080882 A1 * | 6/2002 | Kitagawa | 375/240.29 |
| 2003/0122924 A1 | 7/2003 | Meyers | |
| 2005/0063472 A1 | 3/2005 | Vella et al. | |
| 2007/0076803 A1 * | 4/2007 | Osamoto et al. | 375/240.29 |
| 2008/0122985 A1 | 5/2008 | Xie | |
| 2008/0123984 A1 | 5/2008 | Xie | |
| 2009/0268093 A1 | 10/2009 | Ishihara | |
| 2011/0075729 A1 * | 3/2011 | Dane et al. | 375/240.03 |
| 2011/0164861 A1 | 7/2011 | Kunkel et al. | |

OTHER PUBLICATIONS

Office Action for U.S. Appl. No. 12/574,658 dated Nov. 25, 2011.
Office Action for U.S. Appl. No. 12/574,658 dated Jul. 16, 2012.

* cited by examiner

*Primary Examiner* — Gilberto Barron, Jr.
*Assistant Examiner* — Virginia T Ho
(74) *Attorney, Agent, or Firm* — Ogawa P.C.

(57) ABSTRACT

System and method for transcoding enhancement. According to an embodiment, the present invention provides system for transcoding video. The system includes a controller module. The system also includes a decoding module, the decoding module including an interface for receiving a video in a first format, the video being characterized by a first dimension, the decoding module being adapted to converted the video from first format to a second format in response to a first control signal from the controller module. Furthermore, the system includes a first video processing module, the first video processing module being configured to processes the video in the second format to determined whether to remove one or more types of defects associated with the first video, the first video processing module furthering being adapted to remove one or more types of artifacts.

42 Claims, 4 Drawing Sheets

SYSTEM AND METHOD FOR TRANSCODING WITH QUALITY ENHANCEMENT

CROSS-REFERENCES TO RELATED APPLICATIONS

The present application claims priority to U.S. Provisional Patent Application No. 61/089,448, filed Aug. 15, 2008, which is incorporated by reference herein.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This patent application is directed to video processing techniques. More specifically, embodiments of the present invention are directed to systems and methods for enhancing outputs of transcoding devices or software. For example, a compressed image and/or video is first decoded, then processed to improve quality, and finally encoded again. It is to be understood that embodiments of the present invention are useful to a wide range of applications, such as processing network video, optimizing video and/or images for display, etc. But it is to be appreciated that embodiments of the present invention have a wide range of applications.

Transcoding refers to a process involving digital-to-digital conversion from one format to another. For example, the format before and after the conversion process may be both compressed formats. Typically, the decoding/decompressing processes convert the input data to a raw intermediate format (i.e. PCM for audio or YUV for video). Next an encoding process converts this raw intermediate format into a target format.

For example, transcoding is used to decode a bitstream into YUV format using a compatible decoder and then encode the data using an encoder of a different standard. Another way to transcode is to change the bitstream format from one standard to another without its undergoing the complete decoding and encoding process. Many algorithms exist to achieve this.

Transcoding process is useful in many ways. For example, multimedia contents such as sound, music, video, may be stored in an input format and/or compression rate for certain type of applications. For the purpose of transmission and/or storage, or to be used for a type of applications, the media contents may need to be converted into a specific different format. Various types of conventional transcoding systems are available for performing these tasks. However, the conventional systems are often inadequate for various reasons.

Therefore, improved systems and methods for transcoding and the enhancement thereof are desired.

SUMMARY OF INVENTION

This patent application is directed to video processing techniques. More specifically, embodiments of the present invention are directed to systems and methods for enhancing outputs of transcoding devices or software. For example, a compressed image and/or video is first decoded, then processed to improve quality, and finally encoded again. It is to be understood that embodiments of the present invention are useful to a wide range of applications, such as processing network video, optimizing video and/or images for display, etc. But it is to be appreciated that embodiments of the present invention have a wide range of applications.

According to an embodiment, the present invention provides system for transcoding video. The system includes a controller module. The system also includes a decoding module, the decoding module including an interface for receiving a video in a first format, the video being characterized by a first dimension, the decoding module being adapted to converted the video from first format to a second format in response to a first control signal from the controller module. Furthermore, the system includes a first video processing module, the first video processing module being configured to processes the video in the second format to determined whether to remove one or more types of defects associated with the first video, the first video processing module furthering being adapted to remove one or more types of artifacts. The system also includes a second video processing module, the a second video processing module being configured to adjust one or more characteristics of the video in response to a second control signal from the controller module. Additionally, the system includes an encoding module, the encoding module being configured to covert the video from the second format to a third format in response to a third control signal from the controller module.

According to another embodiment, the present invention provides a method for performing transcoding. The method includes providing a first video, the first video being characterized at least by a first format and resolution, the first format being a compressed format. The method also includes decoding the first video from the first format to a second format. The method also includes processing the first video to determine an amount of artifacts associated with the video. Furthermore, the method includes determining whether to removed one or more artifacts from the first video based on one or more criteria. The method also includes removing one or more artifacts from the first video if it is determined that the one or more artifacts are to be removed. The method further includes adjusting one or more parameters of the first video. The method includes encoding the first video from the second format to the third format.

According to yet another embodiment, the present invention provides a method for performing transcoding. The method includes providing a first video, the first video being characterized at least by a first format and size, the first format being a compressed format. The method also includes decoding the first video from the first format to a second format. The method further includes processing the first video to determine an amount of artificial blocks associated with the video. Also, the method includes determining whether to remove the artificial blocks from the first video the amount of artificial blocks. Furthermore, the method includes removing the artificial blocks from the first video if it is determined that the one or more artifacts are to be removed. The method further includes processing the first video to determine an amount of mosquitoes associated with the video. Moreover, the method includes determining whether to remove the mosquitoes from the first video. The method also includes removing the mosquitoes from the first video if it is determined that the one or more artifacts are to be removed. Also, the method includes encoding the first video from the second format to the third format.

It is to be appreciated that embodiments of the present invention provide an improve system and method for transcoding. In various embodiments, the system in the present invention provide better video and/or image quality after the transcoding process in comparison to the video and/or images transcoded by conventional systems. For example, improvements in video and/or image quality is made possible by correcting and/or adjust the decoded video and/or image before encoding. In various embodiments, the system according to the present invention determines if correction and/or adjustment is needed before applying them, thereby improving transcoding speed and reducing computational costs. It is to be appreciated that various embodiments of the present invention are compatible with conventional systems. For example, in a hardware based transcoding system according to the present invention, the system is compatible for with existing conventional devices, such as video system, network workstation, mobile devices, etc. In another example, a part or the entirety of a transcoding system according to the present invention is implemented as a software that is compatible with the existing systems. As a result, certain embodiments of the present invention can be easily and inexpensively adapted into the existing systems. There are many other benefits as well.

Various additional objects, features and advantages of the present invention can be more fully appreciated with reference to the detailed description and accompanying drawings that follow.

DETAILED DESCRIPTION OF THE INVENTION

This patent application is directed to video processing techniques. More specifically, embodiments of the present invention are directed to systems and methods for enhancing outputs of transcoding devices or software. For example, a compressed image and/or video is first decoded, then processed to improve quality, and finally encoded again. It is to be understood that embodiments of the present invention are useful to a wide range of applications, such as processing network video, optimizing video and/or images for display, etc. But it is to be appreciated that embodiments of the present invention have a wide range of applications.

As explained above, conventional transcoding system are often inadequate for various reasons. Among other things, conventional transcoding systems are only adapted for simple conversion, which may involve change of format and/or size. More specifically, most transcoding systems merely decode a video and/or image in one format and encode the video and/or image into another format. Typically, after the video and/or image in the first format is a compressed format, and through the decoding process, the image is decoded into an uncompressed format. The uncompressed format is then encoded into the second format that is usually a different type of compressed format. In another scenario, the first format before decoding and the second format after encoding are the same type of format, and the transcoding process is used change certain aspects (e.g., size, aspect ratio, etc.) of the video and/or images.

A simple conventional transcoding system, which performs decoding and then encoding, usually degrades video and/or image quality during the process of transcoding. More specifically, a compressed video and/or image usually contain undesirable artifacts, such as blockiness, mosquitoes, and/or noises. When the compressed video and/or image are decoded, these undesirable artifacts are not removed by the conventional transcoding system.

When the uncompressed video and/or image are encoded again, additional artifacts are often introduced to the video and/or image on top of the existing artifacts. As a result, the final transcoded video and/or image have poor quality. Often, such process of generation is referred to as garbage-in-garbage-out (GIGO). That is, Video and/or image quality degrades every time it is processed, especially during the encoding and decoding process. Worse yet, since compression and/or encoding algorithms typically share commons ways of reducing video and/or image size, the same types of artifacts are often worsened along the way.

Therefore, it is to be appreciated that embodiments of the present invention provide integrated mechanisms for removing artifacts from video and/or images during the transcoding processes. In certain embodiments, transcoding systems according to the present invention, in addition to removing artifacts from video and/or images, are configured adjust various parameters associated with video and/or images, such as color, contrast, brightness, etc.

Figure 1:
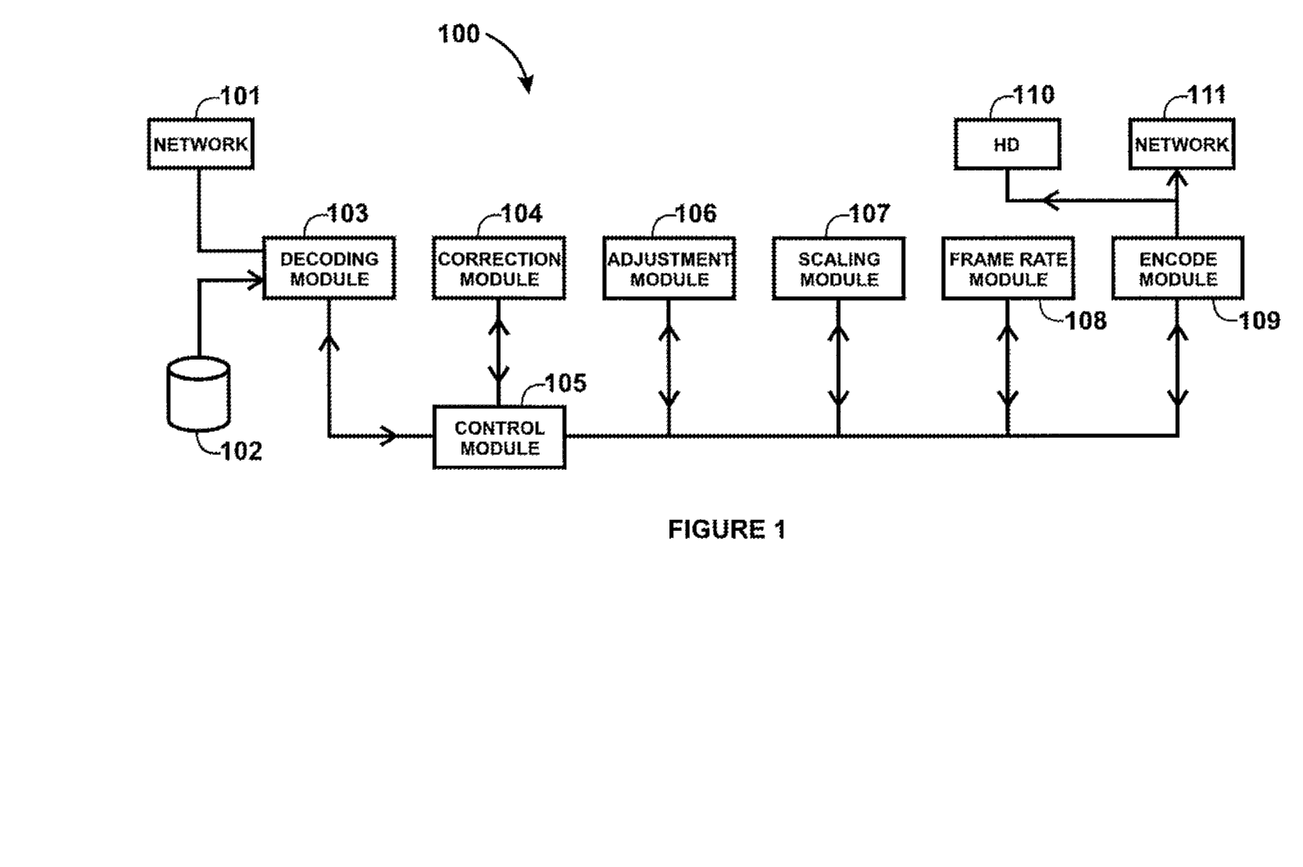
FIG. 1 is a simplified diagram illustrating a transcoding system according to an embodiment of the present invention.

FIG. 1 is a simplified diagram illustrating a transcoding system according to an embodiment of the present invention. This diagram is merely an example, which should not unduly limit the scope of the claims. One of ordinary skill in the art would recognize many variations, alternatives, and modifications.

As shown in FIG. 1, a transcoding system 100 includes the following components:
1. a decoding module 103;
2. a correction module 104;
3. an adjustment module 106;
4. a control module 105;
5. a scaling module 107;
6. a frame rate module 108; and
7. an encoding module 109.

The decoding module 103 is configured to decode a video and/or image from one format (typically a compressed format) to different format. As shown in FIG. 1, the decoding module 103 may receive video and/or image from different types of sources. For example, the decoding module 103 receives a video file or a streamed video from network 101 via a network interface. As another example, the decoding module 103 is configured to decode video and/or image files from a local memory 102, such as a hard disk. When the decoding module receives a video and/or image for decoding, the decoding module 103 determines various information associated with the video and/or image. Among other things, the decoding system at a minimum determines the format of the video and/or image. For example, the decoding system is capable of decoding video and/or images in various types of formats. As shown in FIG. 1, the decoding module 103 is connected to the control module 105. The control module 105 is adapted to provide various control signals that indicate to the decoding module 103 how decoding is to be performed. For example, control signals from the control module indicate what decoding algorithm is to be used, the type of format (e.g., MPEG, Quicktime, AVI, H.264, FLV, etc.) is to be decoded from, the size of the output, the frame rate of the output, the amount of system resources to be used for decoding, etc.

Upon receiving indication from the control module 105, the decoding module 105 decodes the video and/or image file. For example, the video and/or image file, upon decoding, is stored in buffered memory in an uncompressed format. Depending on the control signals received from the control module 105, the decoding module 103 may output the decoded image and/or video in various types of formats.

The decoded video and/or image is then processed by the correction module 104. According to a specific embodiment, the correction module is configured to sequentially (1) remove blockiness, (2) remove mosquitoes, and (3) remove noises. For example, this particular sequence is used to optimize both speed and result according to various embodiments of the present invention. As an example, the larger sized artifacts (e.g., blockiness) are removed first before removing the smaller-sized artifacts (e.g., noises). But it is to be understood that these steps may be modified, rearranged, replaced, repeated, overlapped, and/or removed based on the specific applications involved.

According to various embodiments, the correction module 104 does not simply remove various artifacts and/or noises for all the video and/or images it processes. Instead, the correction module 104 first determines whether these corrections are needed. For example, if it is determined that the blockiness of an image or video is higher than a predetermined threshold level, then the correction module 104 performs the steps of removing blockiness. On the other hand, if it is determined that the blockiness of the image or video is not higher than a predetermined threshold level, then the correction module 104 does not perform the steps of removing blockiness. The similar determination process is applied to other corrective measures, including but not limited to removing mosquitoes and/or removing noises.

Figure 2:
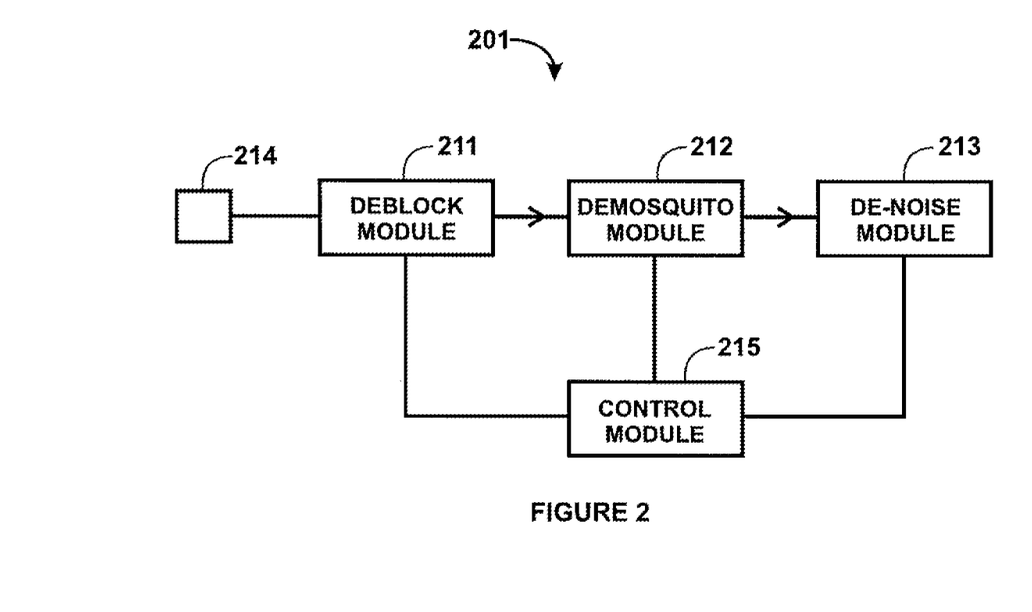
FIG. 2 is a simplified diagram illustrating a correction module according to an embodiment of the present invention.

FIG. 2 is a simplified diagram illustrating a correction module according to an embodiment of the present invention. This diagram is merely an example, which should not unduly limit the scope of the claims. One of ordinary skill in the art would recognize many variations, alternatives, and modifications. As shown in FIG. 2, a correction module 201 includes the following components:

1. a de-blocking module 211;
2. a de-mosquito module 212; and
3. a de-noise module 213.

The three modules are arranged in a serial fashion according to the sequence described above. That is, the de-blocking module 211 receives a decoded video and/or image 214 from the decoding module. The de-blocking module 211 determines a level of blockiness associated with the video and/or image. The de-blocking module 211 removes blockiness from the video and/or image if the blockiness is higher than a predetermined threshold level. As an example, operation of the de-blocking module 211 is controlled by the control module 215.

Depending on the specific application, various types of methods may be used to perform the process of removing blockiness. For example, the method of removing blockiness is described in U.S. application Ser. No. 11/925,744 filed Oct. 26, 2007 and U.S. application Ser. No. 11/766,081 filed Jun. 20, 2007, both of which are incorporated by reference herein for all purposes.

Artifacts such as "blockiness" exist typically because block based coding technique is used. For example, a commonly used blocking coding technique applies discrete cosine transform when encoding a video and/or image. For example, compression formats (such as JPEG, MJPEG, MPEG, DV) uses the discrete cosine transform to reduce file size. During the encoding process, a discrete cosine transform of an N×N sized block (typically 8×8) from the video and/or image is computed and quantized. As a result of this encoding method in which an image and/or video is divided into blocks, undesirable artificial edges and/or block boundaries are often created as a by-product.

Figure 3:
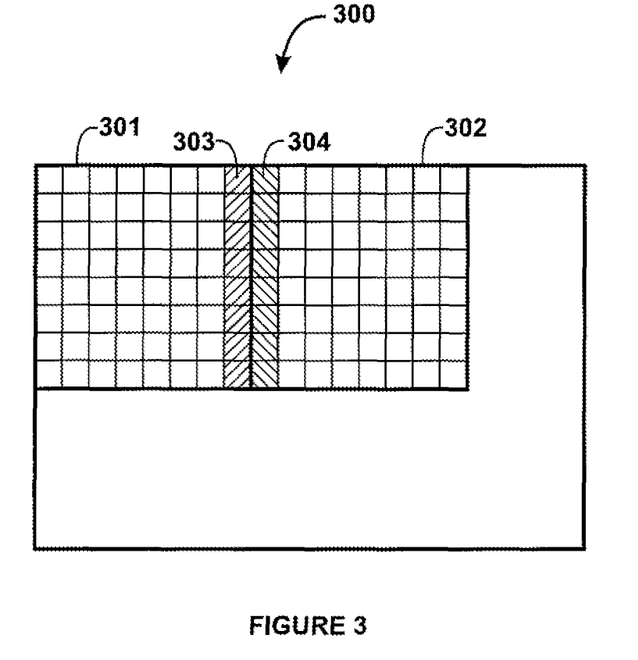
FIG. 3 is a simplified diagram illustrating the a process for removing block artifacts according to an embodiment of the present invention.

FIG. 3 is a simplified diagram illustrating the a process for removing block artifacts according to an embodiment of the present invention. This diagram is merely an example, which should not unduly limit the scope of the claims. One of ordinary skill in the art would recognize many variations, alternatives, and modifications.

As shown in FIG. 3, a image 300 (which may be a frame of a video) includes two 8×8 blocks: block 301 and block 302. The column 303 of the block 301 and the column 304 of the block 302 are adjacent to each other. The deblocking module 211 is configured to determine the block size and identify pixels within the adjacent columns 303 and 304. In a specific algorithm according to the present invention, each adjacent pairs of pixels from different blocks are compared. The difference (e.g., measured in luma value, chroma value, or the combination thereof) between the adjacent pixel is then summed up. If the sum is greater than a threshold value (which typically indicates that an artificial block edge exists), then the deblocking module 211 will apply deblocking filter. On the other hand, if the sum is not greater than a threshold value, the deblocking module 211 will not apply deblocking filter.

It is to be understood that other deblocking algorithms may be used as well to remove artificial blocks. That is, if the deblocking module 211 determines that deblocking process is needed.

Now referring back to FIG. 2. Once the deblocking process is performed by the deblocking module 211, the processed video and/or image is processed by the de-mosquito module 212.

Typically, mosquito noise is most apparent around artificial or Computer Generated objects or scrolling credits (lettering) on a plain colored background. For example, mosquito noise appears as some haziness and/or shimmering around high-frequency content (sharp transitions between foreground entities and the background or hard edges) and can sometimes be mistaken for ringing. Sometimes, this undesirable effect is visible around more natural shapes like a human body. For example, the mosquito noise can be referred to as a form of edge busyness distortion sometimes associated with movement, characterized by moving artifacts and/or blotchy noise patterns superimposed over the objects (resembling mosquito flying around a person's head and shoulders). Sometimes, the mosquito noises are also referred to as "Gibbs effect".

Similar to the process for removing block artifacts described above, the de-mosquito module is configured to calculate an amount of mosquito artifacts to determined if the de-mosquito process is needed. For example, if the amount of mosquito is determine to be higher than a predetermined threshold level, the de-mosquito process is performed. On the other hand, if the amount of mosquito is determined to be no higher than the predetermined threshold level, the de-mosquito process is not performed.

Once the de-mosquito process is performed by the de-mosquito module 212, the processed video and/or image is processed by the de-noise module 213. Similar to the process for removing block artifacts described above, the de-noise module 213 is configured to calculate an amount of noise (e.g., luma noise, chroma noise) to determine if the de-noise process is needed. For example, if the amount of noise (e.g., based on a signal to noise ratio) is determined to be higher than a predetermined threshold level, the de-noise process is performed. On the other hand, if the amount of noise is determined to be no higher than the predetermined threshold level, the de-noise process is not performed. In another embodiment, noise characteristics (e.g., noise shape, noise stride, etc.) are also determined. Based on the noise characteristics, one or more de-noise noise filters may be selected and used.

Now referring back to FIG. 1. After various corrections are applied to the video and/or image, the corrected images are processed by the adjustment module 106, the scaling module 107, and/or the frame rate module 108. As shown in FIG. 1, the operation of these modules are controlled by the control module 105. For example, the control module 105 is configured to determine what adjustments such as color, saturation, and/or brightness should be made by the adjustment module 106 and how much. Similarly, the control module 105 is also configured to determine if scaling is needed to be performed by the scaling module 107, or if frame rate needs to be changed by the frame module 108. For example, the processes performed by the adjustment module 106, the scaling module 107, and/or the frame rate module 108 are described in U.S. application Ser. No. 11/925,744 filed Oct. 26, 2007 and U.S. application Ser. No. 11/766,081 filed Jun. 20, 2007.

After the video and/or image is corrected and/or adjusted, the encoding module 109 performs encoding. The encoding module 109 is configured to encode the uncompressed, corrected, and/or adjusted video and/or image into a new format. For example, the new format is a compressed format, which may be same or different from the format of the video and/or image before decoding. Depending on the application, both the decoding module 103 and the encoding module 109 may be implemented as specialized hardware modules and/or software modules executed by a general purpose processor. For example, the decoding module 103 and the encoding module 109 are hardware chips that are optimized and integrated into various devices for performing decoding and/or encoding process. In a specific embodiment, the encoding module 109 is able to encode video and/or images into a variety formats, and the control module 105 is configured to provide one or more signals to indicate what should be the output format of the encoding module 109.

Once encoded, encoding module 109 outputs the encoded video and/or image. Depending on the need, the output may be a network 111 or a local storage 110. For example, the output may be streamed to the network 111 for realtime playback and/or display. As another example, the output may be stored in local hard disk for later use.

Figure 4:
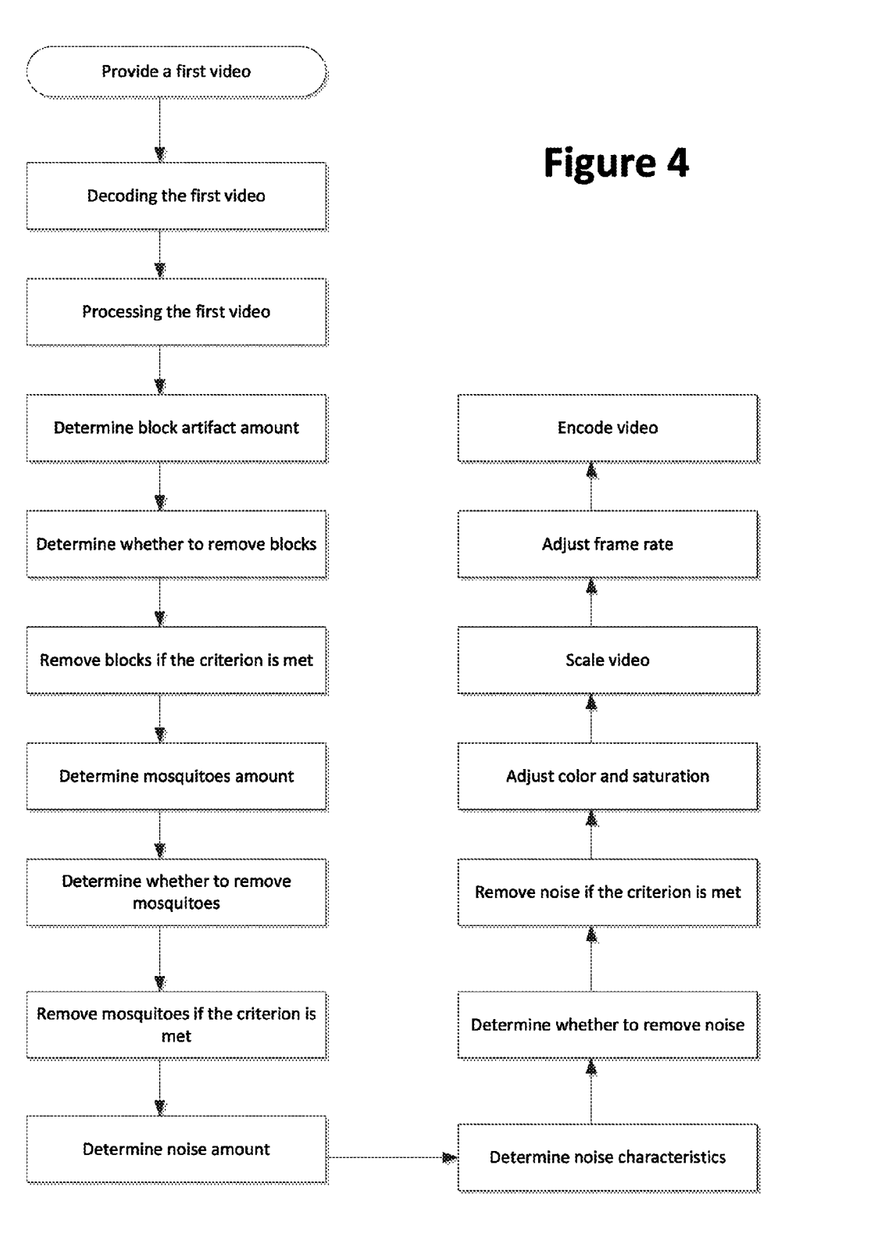
FIG. 4 is a simplified flow diagram illustrating a transcoding process according to an embodiment of the present invention.

FIG. 4 is a simplified flow diagram illustrating a transcoding process according to an embodiment of the present invention. This diagram is merely an example, which should not unduly limit the scope of the claims. One of ordinary skill in the art would recognize many variations, alternatives, and modifications.

As shown in FIG. 4, the transcoding process includes the following steps:
1. providing a first video, the first video being characterized at least by a first format and size, the first format being a compressed format;
2. decoding the first video from the first format to a second format;
3. processing the first video to determine an amount of blocking artifacts associated with the video;
4. determining whether to removed the blocking artifacts from the first video based on at least a first criterion,
5. removing blocking artifacts from the first video if it is determined that the first criterion is satisfied;
6. processing the first video to determine an amount of mosquitoes associated with the video;
7. determining whether to removed the mosquitoes from the first video based on at least a second criterion;
8. removing mosquitoes from the first video if it is determined that the second criterion is satisfied;
9. processing the first video to determine an amount of noise associated with the video;
10. processing the first video to determine one or more noise characteristics;
11. determining whether to removed the noises from the first video based on at least a third criterion;
12. removing noises from the first video if it is determined that the third criterion is satisfied;
13. adjusting color, saturation, and/or brightness;
14. scaling the video and/or images if needed;
15. adjusting the frame rate of the video if needed; and
16. encoding the first video from the second format to the third format.

As an example, the process shown in FIG. 4 can be performed by the system 100 shown in FIG. 1. It is to be understood that various steps shown in FIG. 4 can be added, removed, replaced, modified, rearranged, repeated, and/or overlapped.

It is to be appreciated that there are many alternative embodiments of the present invention. For example, a user interface may be provided. In a specific embodiment, the system in FIG. 1 decode, enhances, and encodes multiple (e.g., 3, 5, 7, etc.) lines at a time as opposed one image at a time. For example, the process is performed using line buffers.

It is to be appreciated that embodiments of the present invention provide an improve system and method for transcoding. In various embodiments, the system in the present invention provide better vide and/or image quality after the transcoding process in comparison to the video and/or images transcoded by conventional systems. For example, improvements in video and/or image quality is made possible by correcting and/or adjust the decoded video and/or image before encoding. In various embodiments, the system according to the present invention determines if correction and/or adjustment is needed before applying them, thereby improving transcoding speed reducing computational costs. It is to be appreciated that various embodiments of the present invention are compatible with conventional systems. For example, in a hardware based transcoding system according to the present invention, the system is compatible for with existing conventional devices, such as video system, network workstation, mobile devices, etc. In another example, a part or the entirety of a transcoding system according to the present invention is implemented as a software that is compatible with the existing systems. As a result, certain embodiments of the present invention can be easily and inexpensively adapted into the existing systems. There are many other benefits as well.

The embodiments above can be implemented into various type of systems. For example, these embodiments may be implemented as software algorithms that are executed when displaying, editing, and/or transmitting videos and images. In certain embodiments, techniques according to the present invention may be hardwired to image and/or video processing chips. It is to be appreciated that many types of image and video systems can benefit from embodiments of the present invention. For example, these system include, but not limited to, personal computer, television, media player, mobile phone, network device, etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for transcoding video, the system comprising:
  a controller module;
  a decoding module, the decoding module including an interface for receiving a video in a first format, the video being characterized by a first dimension, the decoding module being adapted to convert the video from first format to a second format in response to a first control signal from the controller module;
  a buffer memory for storing at least a part of the video;
  a first video processing module, the first video processing module being configured to process the video in the second format to determine whether to remove two or more types of defects associated with the video, the first video processing module furthering being adapted to remove two or more types of artifacts in accordance with a processing sequence, wherein large-sized defects are removed before removal of small-sized defects, large-size defects including blockiness, small-sized defects including mosquitoes and noises, mosquitoes being removed before noises;
  a second video processing module, the second video processing module being configured to adjust contrast, saturation, color, an/or brightness of the video in response to a second control signal from the controller module; and
  an encoding module, the encoding module being configured to convert the video from the second format to a third format in response to a third control signal from the controller module.

2. The system of claim 1 wherein the first video processing module is configured to determine whether the first format is a raw format.

3. The system of claim 1 wherein the video is streamed from a network source.

4. The system of claim 1 wherein the video is from a hard disk, optical storage, or flash memory.

5. The system of claim 1 wherein the first format comprises a compressed format.

6. The system of claim 1 wherein the second format comprises a uncompressed format.

7. The system of claim 1 wherein the decoding module includes a network interface for receiving network video stream.

8. The system of claim 1 wherein the decoding module is configured to determine a format that is associated with the first video.

9. The system of claim 1 further comprising a third video processing module configured to adjust the frame rate of the video.

10. The system of claim 1 further comprising a third video processing module configured to change a size of the video.

11. The system of claim 1 wherein the two or more types of artifacts include blockiness, noises; ringing, and/or mosquitoes.

12. The system of claim 1 wherein the one or more characteristics include contrast, saturation, color, and/or brightness.

13. The system of claim 1 wherein the third format is configured for online streaming playback.

14. The system of claim 1 further comprising a memory for storing the video in the third format.

15. The system of claim 1 further comprising a user interface.

16. The system of claim 1 further comprising a display.

17. A method for performing transcoding, the method comprising:
  providing a first video, the first video being characterized at least by a first format and resolution, the first format being a compressed format;
  decoding the first video from the first format to a second format;
  processing the first video to determine an amount of artifacts associated with the video;
  determining whether to remove two or more artifacts from the first video based on one or more criteria;
  removing two or more artifacts from the first, the two or more artifacts including large-sized artifacts and small-sized artifacts, the large-sized artifacts being removed before removing the small-size artifacts; the blockiness removal process is performed before the mosquitoes removal process;
  adjusting contrast, saturation, color, and/or brightness of the first video; and
  encoding the first video from the second format to the third format.

18. The method of claim 17 wherein the determining whether to remove two or more artifacts comprises calculating an amount of artificial blocks.

19. The method of claim 17 wherein the determining whether to remove two or more artifacts comprises calculating an amount of noise.

20. The method of claim 17 wherein the determining whether to remove two or more artifacts comprises calculating an amount of noise ringing.

21. The method of claim 17 wherein the determining whether to remove two or more artifacts comprises determining a type associated with the two or more artifacts.

22. The method of claim 17 further comprising calculating an amount of mosquitoes.

23. The method of claim 17 wherein the removing two or more artifacts comprises removing artificial blocks, mosquitoes, and/or noises.

24. The method of claim 17 further comprising receiving the first video from a network source.

25. The method of claim 17 further comprising determining the first format.

26. The method of claim 17 further comprising sending the first video in the third format to a network.

27. The method of claim 17 further comprising storing the first video.

28. The method of claim 17 further comprising displaying the first video.

29. The method of claim 17 further comprising resizing the first video.

30. The method of claim 17 further comprising changing a frame rate of the first video.

31. The method of claim 17 further wherein the one or more parameters include color, saturation, sharpness, and/or brightness.

32. The method of claim 17 further comprising determining a block size, the block size being associated with the first format.

33. The method of claim 17 further comprising determining a block edge.

34. The method of claim 17 further comprising determining a signal to noise ratio.

35. The method of claim 17 further comprising determining one or more noise characteristics.

36. The method of claim 17 further comprising performing de-interlacing.

37. A method for performing transcoding, the method comprising:
- providing a first video, the first video being characterized at least by a first format and resolution, the first format being a compressed format;
- decoding the first video from the first format to a second format;
- processing the first video to determine an amount of blockiness associated with the video;
- determining whether to remove the blockiness from the first video if the amount of blocks blockiness exceeds a predetermined artifact threshold;
- processing the first video to determine an amount of mosquitoes associated with the video;
- providing a processing sequence for removing artifacts, the artifacts including large-sized artifacts and small-sized artifacts, the large-sized artifacts being removed before removing the small-sized artifacts according to the processing sequence, the large-sized artifacts including the blockiness and the small-sized artifacts including mosquitoes;
- removing the blockiness from the first video if it is determined that the one or more artifacts are to be removed;
- determining whether to remove the mosquitoes from the first video if the amount of mosquitoes exceeds a predetermined mosquitoes threshold;
- removing the mosquitoes from the first video if it is determined that the one or more mosquitoes are to be removed, wherein the mosquitoes are removed after removing the blockiness; and
- encoding the first video from the second format to the third format.

38. The method of claim 37 further comprising:
- processing the first video to determine an amount of noises associated with the video;
- determining whether to remove the noises from the first video based on the amount of blockiness;
- removing the noises from the first video if it is determined that the one or more artifacts are to be removed.

39. The method of claim 37 further comprising adjusting one or more parameters associated with the video.

40. The method of claim 37 further comprising adjusting a frame rate associated with the video.

41. The method of claim 37 further comprising scaling the video.

42. The method of claim 37 further comprising de-interlacing the video.

* * * * *